A. SHENSON.
TIRE TIGHTENER FOR VEHICLE WHEELS.
APPLICATION FILED SEPT. 16, 1914.
1,147,050. Patented July 20, 1915.
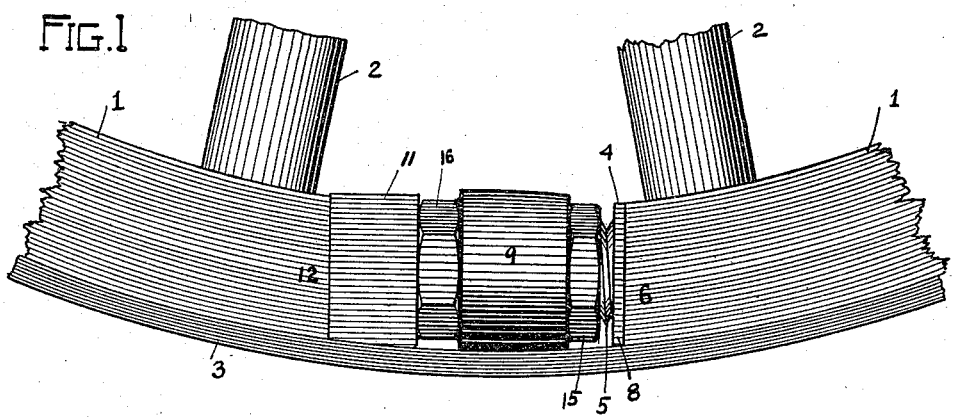
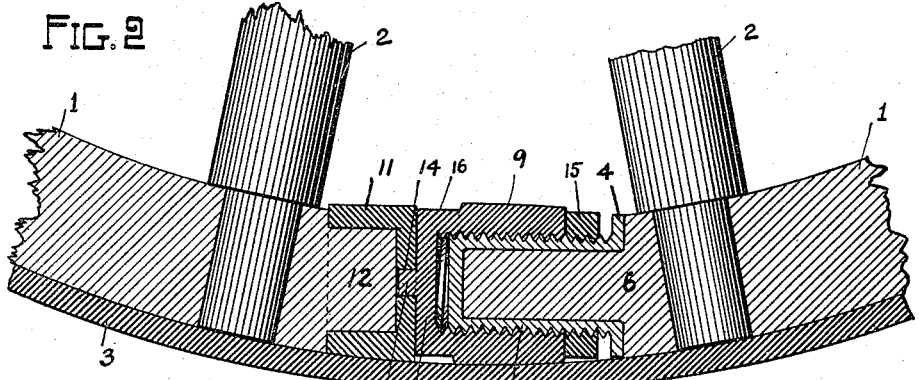
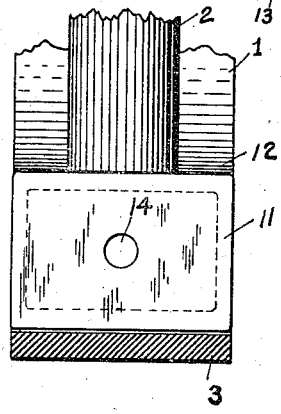
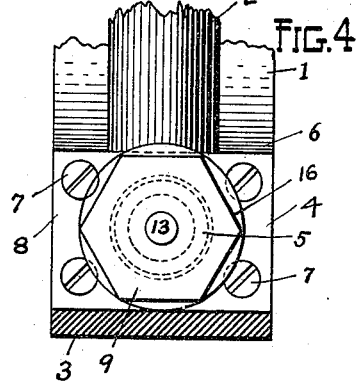
WITNESSES
M. Parker
James Parker
INVENTOR
Aaron Shenson
By Marcus S. Leve
Attorney

UNITED STATES PATENT OFFICE.

AARON SHENSON, OF SAN FRANCISCO, CALIFORNIA.

TIRE-TIGHTENER FOR VEHICLE-WHEELS.

1,147,050.  Specification of Letters Patent.  Patented July 20, 1915.

Application filed September 16, 1914. Serial No. 861,995.

*To all whom it may concern:*

Be it known that I, AARON SHENSON, a citizen of the United States, residing in the city and county of San Francisco and State of California, have invented certain new and useful Improvements in Tire-Tighteners for Vehicle-Wheels, of which the following is a specification.

This invention relates to tire tighteners for vehicle wheels, and my improvement consists in providing the wooden rim of the wheel with the proper mechanism whereby the said rim may be readily expanded in the dry season of the year, when it becomes contracted, and drawn together in the wet season of the year, when the wood swells, thus eliminating an excessive strain on the tire. The expanding mechanism is so formed and arranged as to lock together the two ends of the wooden rim at the joint, causing them to steady one another and to give support to that portion of the tire which extends over the joint.

In the accompanying drawings, which form part of this specification, Figure 1 is a side elevation of a portion of a wheel rim and tire, provided with my improvement. Fig. 2 is a longitudinal section through the middle of the rim. And Figs. 3 and 4 are end views of the shoe attachments, forming my improvement.

In the figures 1 represents the wooden rim of a vehicle wheel, which is secured to the spokes 2 in the usual way, and carries at the outside the metallic tire 3. The wooden rims of wheels are usually made in one or in a number of pieces, bent to the proper curve, the ends forming a joint by being made to butt one against the other.

In my improvement I attach at one of the joints of the rim two metallic shoes 4 and 11, one at each of the adjoining ends of the rim. The shoe 4 consists of a cylindrical bushing 5 fitted to the end 6 of the wooden rim and secured to it by a number of screws 7, passing through the flange 8 of the shoe. The outside of the bushing 5 is threaded, and over it a sleeve 9, threaded in the inside, is made to work. The sleeve is closed at one end by the head 10, which head is made to butt against a shoe 11 fitted and secured to the other adjoining end 12 of the wooden rim; a centering pin 13 is carried by the head 10 which is made to enter a hole 14 drilled in the shoe 11. By turning the sleeve 9 in one or in the other direction the distance between the two adjoining ends 6 and 12 of the rim may be readily increased or diminished. An increase of said distance will cause the outside diameter of the rim to increase and to adhere tighter to the inside of the metallic tire, while a decrease of said distance will diminish the outside diameter of the rim and will reduce any excessive strain on the tire. When the sleeve 9 is brought to the proper adjustment it is made fast to the bushing 5 by the jam nut 15. The sleeve 9 is turned at the outside, so as to fit the inner curve of the tire, as shown in Figs. 1 and 2, thus giving some support to the latter; it is also provided with a hexagonal portion 16 for the application of a wrench.

The tightening device here described will enable any one to adjust the grip of the tire on the rim very readily, thus preventing the bursting of the tire in the wet season of the year, and save the wear of the wooden rim in the dry season.

Having thus described my invention, what I claim and desire to secure by Letters Patent is:

1. In a device of the class described a felly having a rounded projection at one end and at the other end a projection of reduced dimensions, a shoe formed with a tubular portion driven on over said rounded projection of the felly and furnished with a long screw thread at the free end, an abutting shoe driven over the reduced projection of the said other end of the felly, and an expanding member furnished with a long thread fitting the thread on the said tubular portion of the first stated shoe and provided with a head engaging the said abutting shoe.

2. In a device of the class described a felly having a rounded projection at one end and at the other end a projection of reduced dimensions, a shoe formed with a tubular portion driven on over the said rounded projection of the felly and furnished with a long screw thread at the free end, an abutting shoe driven over the reduced projection of the said other end of the felly, an expanding member furnished with a long thread fitting the thread on the said tubular portion of the first stated shoe and provided with a head engaging the said abutting shoe, and centering means interposed between the said expanding member and the said abutting shoe consisting of a centering pin carried by one of the said members engaging a seat in the other member.

3. In a device of the class described a felly having a rounded projection at one end and at the other end a projection of reduced dimensions, a shoe formed with a tubular portion driven on over the said rounded projection of the felly and furnished with a long screw thread at the free end, an abutting shoe driven over the reduced projection of the said other end of the felly, an expanding member furnished with a long thread fitting the thread on the said tubular portion of the first stated shoe and provided with a head engaging the said abutting shoe, the outside of the said expanding member being fitted to run in contact with the inner side of the tire, and centering means interposed between the said expanding member and the said abutting shoe consisting of a centering pin carried by one of the said members engaging a seat in the other member.

AARON SHENSON.

Witnesses:
M. PARKER,
JAMES PARKER.

Copies of this patent may be obtained for five cents each, by addressing the "Commissioner of Patents, Washington, D. C."